March 8, 1955
E. P. MILLER
2,703,846
AUXILIARY LOAD REGULATING DEVICE
FOR DIESEL-ELECTRIC ENGINES
Filed Aug. 7, 1953
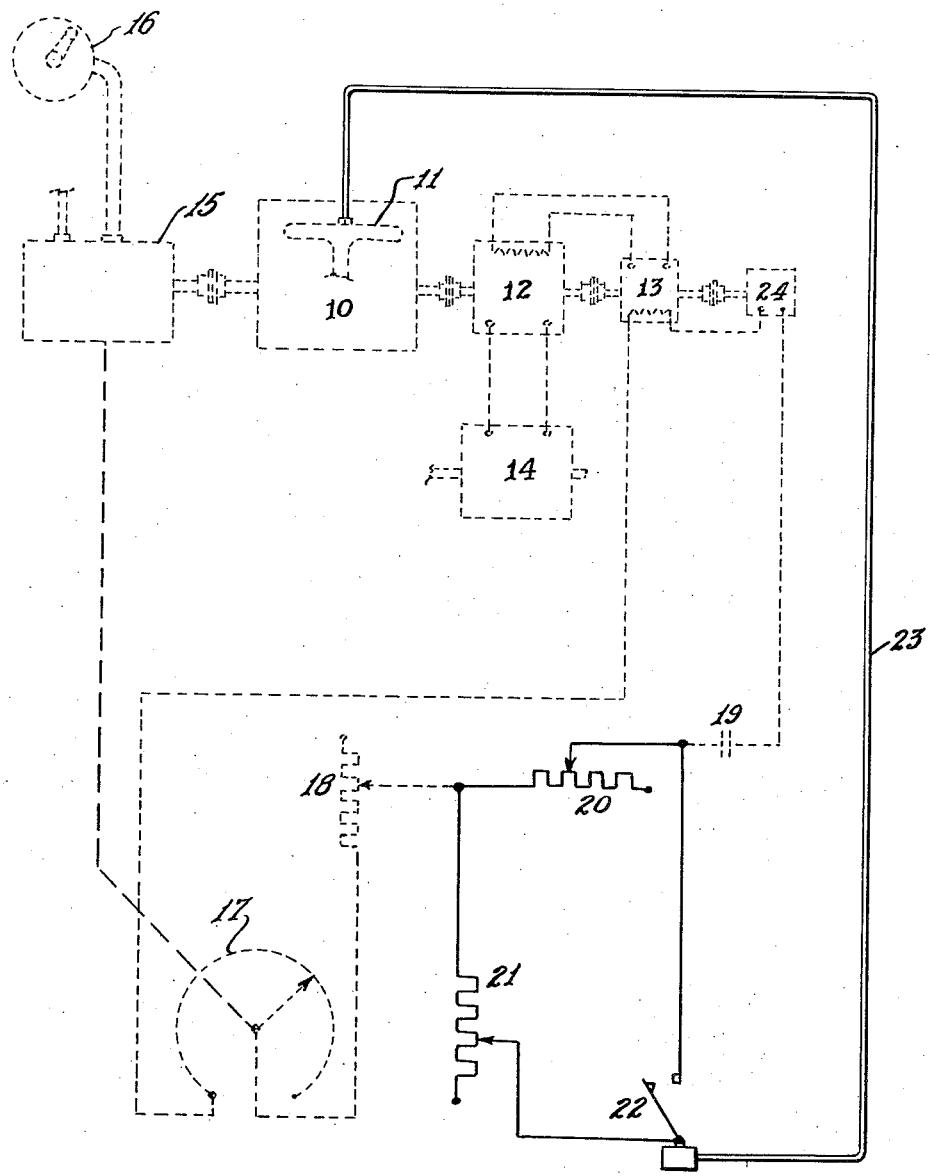
INVENTOR.
EUGENE P. MILLER,
BY
Allen & Allen
ATTORNEYS.

United States Patent Office 2,703,846
Patented Mar. 8, 1955

2,703,846

AUXILIARY LOAD REGULATING DEVICE FOR DIESEL-ELECTRIC ENGINES

Eugene P. Miller, Hamilton, Ohio, assignor to Armco Steel Corporation, Middletown, Ohio, a corporation of Ohio Application August 7, 1953, Serial No. 372,984

4 Claims. (Cl. 290—17)

This invention relates to an auxiliary load regulating device for diesel-electric engines.

In the conventional diesel-electric engine, a diesel engine drives a D. C. generator which in turn furnishes power for a D. C. electric motor which drives the engine wheels. The generator is usually a separately excited generator so that the excitation is furnished by a small exciter which is also driven by the diesel engine.

The diesel engine also drives a governor which controls the speed of the engine. Control is had by means of a controller in the locomotive cab which controller, in its various positions, actuates electrical relays which regulate the governor. Thus, if the controller handle is moved step by step in starting up and increasing the speed of the locomotive, at each point on the control certain relays are energized which regulate the governor of the diesel engine.

Diesel-electric locomotives of the kind to which reference is made are generally also provided with exhaust gas driven turbo-chargers to force air into the intake manifold.

The separate excitation for the main generator is supplied by a small exciter generator, the field of which, in turn is excited by an auxiliary generator driven from the same shaft as the exciter generator. When the controller handle is moved to cause the diesel engine to run faster, the governor is controlled as above set forth and in turn controls the position of the load regulating rheostat.

Particularly in connection with diesel-electric switch locomotives it is desirable to be able to come up to full power in a minimum length of time. The difficulty, however, is that if the controller is moved up too fast, the governer moves the load rheostat to decrease the excitation on the main generator. In other words, the load rheostat adds resistance to the exciter circuit. Thus, the engine picks up speed and comes up to power very slowly.

With the foregoing considerations in mind, it is an object of the present invention to provide an arrangement which permits a diesel-electric locomotive to come up to full power with great rapidity.

It is another object of the invetnion to provide a device whereby the governor can better control the loading up of the diesel engine at all engine speeds and to prevent overloading the engine at all engine speeds.

It is still another object of the invention to provide a device whereby the locomotive can operate with the turbo-charger not working without overloading the engine. Still another object of the invention is the provision of an arrangement which increases the production of the locomotive by about 20% because of the faster starting ability of the engine and because of the ability to "kick" cars.

These and other objects of the invention, which I shall describe in greater detail hereinafter or which will become apparent to one skilled in the art from a study of these specifications, I accomplish by that certain construction and arrangement of parts of which I shall now describe an exemplary embodiment.

Reference is made to the drawing forming a part hereof, which drawing is a diagrammatic showing of the more important parts of the diesel-electric locomotive and showing the application of my invention thereto.

Briefly, in the practice of my invention, I provide a resistor in the field circuit of the exciter generator and I provide an additional resistor in parallel to the first resistor. I then provide a pressure switch for cutting the second resistor into parallel with the first resistor or to cut the second resistor out of the circuit. The pressure switch is connected to the intake manifold of the diesel engine so that the pressure switch (which is spring held in open position) closes when the intake manifold pressure reaches a certain value and opens when the manifold pressure drops below that value.

Referring now in more detail to the drawing, I have shown schematically at 10 a diesel engine having an intake manifold 11. The diesel engine 10 drives a main generator 12, an exciter generator 13, and an auxiliary generator 24. The exciter generator 13 furnishes excitation for the field of the main generator 12. The generator 12 provides power for the traction motor 14 which drives the locomotive. The auxiliary generator 24 furnishes excitation for the exciter generator 13, and also furnishes current for other purposes. The generator 24 is a constant voltage generator.

The diesel engine is shown also as driving a governor 15. The spring loading of the governor 15 is determined by a series of solenoids which are energized at various positions by the controller 16 under the control of the engineer. A load rheostat which is actuated by the governor is shown at 17. Conventionally, the exciter field circuit includes a fixed resistor 18 and a contactor 19. The contactor 19 closes on the first point of the controller 16. In the drawing the circuits shown in broken lines are in all respects conventional and only so much of the circuit as is shown in solid lines is added according to the present invention.

By way of example, I place in the exciter field circuit a first added resistor 20. A second added resistor 21 is provided in parallel to the resistor 20 but the parallel circuit is provided with a normally open pressure switch 22. The pressure switch 22 is actuated by intake manifold pressure supplied to it through the line 23.

From what has been said above, it will be clear that the resistor 20 is at all times in the exciter field circuit and that the resistor 21 is normally not in the exciter field circuit. Upon actuation of the pressure switch 22, it will be clear that the resistor 21 is placed in parallel with the resistor 20 so that the effective value of the resistors 20 and 21 is reduced.

In the specific example shown, the load resistor 17 has a range from 0 to about 25 ohms and the resistor 18 has a value of 11.1 ohms. The resistor 20 has a value of 15 ohms and the resistor 21 has a value of 22 ohms. Thus, when the pressure switch is open, the total resistance in the exciter circuit equals 26.1 ohms plus the value of the resistance 17. When the pressure switch 22 closes, placing the resistors 20 and 21 in parallel, the total effective resistance is approximately 20 ohms plus the value of the load resistance 17.

The values of resistance given are exemplary. The resistors 18, 20 and 21 are shown as variable resistors but it will be clear that when the actual values of the resistors required for a particular locomotive have been determined, these variable resistors may be replaced with fixed resistors of the value required.

In the particular embodiment illustrated, the pressure switch 22 is set to operate at 3½ pounds manifold pressure. When the intake manifold pressure reaches 3½ pounds switch 22 closes and when the pressure drops below 3½ pounds the switch 22 opens. It will be understood that if the switch 22 is set for lower pressure, the locomotive will be peppier but it will create more smoke. I find that 3½ pounds is about as low as one can go economically.

With the present invention installed in a diesel-electric locomotive, if the controller is rapidly moved and the diesel engine starts to bog down, the governor controls the load rheostat 17 to add resistance to the exciter field circuit. As the manifold pressure builds up, the pressure switch 22 closes and reduces the effective value of the resistance load in the exciter field circuit, thus preventing overloading and enabling the diesel-electric locomotive to come up to full speed and power with much greater rapidity.

An actual diesel-electric switch locomotive on which the present invention has been installed can deliver engine speeds from 450 R. P. M. to 1,006 R. P. M. in five seconds without overloading the engine. This engine can also deliver 1050 H. P. in 10 seconds without overloading.

It will be clear from what has gone before that the added resistance in the exciter field circuit makes it possible to operate the locomotive without overloading the engine even when the turbo-charger is not working. Even under these conditions the locomotive will still deliver about 725 H. P.

It will be clear that numerous modifications may be made without departing from the spirit of the invention and by appropriate choice of the values of the resistors, the resistors 18 and 20 may be combined. This would certainly be true in the building of new diesel-electric locomotives. However, with diesel-electric locomotives now in use it is a simple matter to install the additional resistors 20 and 21 and the pressure switch 22 with its control line 23.

It will be understood, therefore, that I do not intend to limit myself in any other way other than as set forth in the claims which follow.

Having now fully described my invention, what I claim as new and desire to secure by Letters Patent is:

1. In a diesel-electric locomotive wherein a diesel engine having an intake manifold drives a separately excited electric generator, an exciter generator having a field circuit including a resistance, and a constant voltage auxiliary generator for supplying excitation for said exciter generator, said separately excited generator supplying power to an electric traction motor, said diesel engine having a governor provided with control solenoids and said locomotive having a load rheostat for controlling the resistance in the exciter field circuit and a controller for energizing the governor control solenoids; an added resistance in said exciter field circuit, means for reducing the value of said added resistance and a pressure actuated switch for actuating said reducing means, said pressure switch being operatively connected to the intake manifold of said diesel engine to cause said pressure actuated switch to close when said manifold pressure reaches a certain value, and to open when said pressure drops below said certain value.

2. In a diesel-electric locomotive wherein a diesel engine having an intake manifold drives a separately excited electric generator, an exciter generator having a field circuit including a resistance, and a constant voltage auxiliary generator for supplying excitation for said exciter generator, said separately excited generator supplying power to an electric traction motor, said diesel engine having a governor provided with control solenoids, and said locomotive having a load rheostat for controlling the resistance in the exciter field circuit and a controller for energizing the governor control solenoids; a first added resistance in said exciter field circuit, a second added resistance in parallel to said first added resistance, and a pressure actuated switch for opening and closing said parallel added resistance circuit, said pressure switch being operatively connected to the intake manifold of said diesel engine to cause said pressure actuated switch to close when said manifold pressure reaches a certain value, and to open when said pressure drops below said certain value.

3. A device according to claim 2 wherein said exciter field circuit includes a fixed resistance of about 11 ohms and a variable resistance having a range from 0 to about 25 ohms and wherein said first added resistance has a value of about 15 ohms, and said second added resistance has a value of about 22 ohms.

4. A device according to claim 2 wherein said exciter field circuit includes a fixed resistance of about 11 ohms and a variable resistance having a range from 0 to about 25 ohms and wherein said first added resistance has a value of about 15 ohms, and said second added resistance has a value of 22 ohms, and said pressure actuated switch is set to close at manifold pressures from about 3½ pounds per square inch up and to open at manifold pressure below 3½ pounds per square inch.

References Cited in the file of this patent

UNITED STATES PATENTS

| Number | Name | Date |
|---|---|---|
| 1,216,237 | Lemp | Feb. 13, 1917 |
| 1,745,130 | Turner | Jan. 28, 1930 |
| 1,768,165 | Stokes | June 24, 1930 |
| 1,831,823 | Pope, Jr. | Nov. 17, 1931 |
| 1,929,382 | Arthur | Oct. 3, 1933 |
| 2,145,611 | Schlaepfer | Jan. 31, 1939 |
| 2,187,781 | Greer | Jan. 23, 1940 |
| 2,303,951 | Oswald | Dec. 1, 1942 |
| 2,434,413 | Justus | Jan. 13, 1948 |
| 2,500,882 | Staples | Mar. 14, 1950 |
| 2,658,152 | Brancke | Nov. 3, 1953 |